(12) United States Patent
Ziemer

(10) Patent No.: US 6,860,831 B2
(45) Date of Patent: Mar. 1, 2005

(54) MULTI-STAGE TRANSMISSION

(75) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/472,611

(22) PCT Filed: Mar. 27, 2002

(86) PCT No.: PCT/EP02/03436
§ 371 (c)(1),
(2), (4) Date: Sep. 18, 2003

(87) PCT Pub. No.: WO02/079671
PCT Pub. Date: Oct. 10, 2002

(65) Prior Publication Data
US 2004/0116238 A1 Jun. 17, 2004

(30) Foreign Application Priority Data
Mar. 30, 2001 (DE) .......................... 101 15 987

(51) Int. Cl.$^7$ ................................ F16H 3/44
(52) U.S. Cl. .................. 475/296; 475/275; 475/280; 475/295
(58) Field of Search ................ 475/275–280, 475/282, 284, 286, 288, 290, 295, 296, 311, 313, 317, 319, 323, 325

(56) References Cited

U.S. PATENT DOCUMENTS

| | | | |
|---|---|---|---|
| 4,395,925 A | 8/1983 | Gaus | 74/763 |
| 5,106,352 A | 4/1992 | Lepelletier | 475/280 |
| 5,133,697 A * | 7/1992 | Hattori | 475/276 |
| 5,222,923 A * | 6/1993 | Hotta et al. | 475/276 |
| 5,342,257 A | 8/1994 | Hotta et al. | 475/275 |
| 5,358,458 A | 10/1994 | Hicks | 475/269 |
| 5,716,298 A * | 2/1998 | Beim et al. | 475/275 |
| 5,749,805 A * | 5/1998 | Shimada et al. | 477/116 |
| 6,071,208 A * | 6/2000 | Koivunen | 475/275 |
| 6,645,115 B1 * | 11/2003 | Usoro et al. | 475/275 |
| 6,746,362 B2 * | 6/2004 | Lee et al. | 475/296 |
| 6,802,795 B2 * | 10/2004 | Miyazaki et al. | 475/275 |
| 2003/0083174 A1 * | 5/2003 | Tabata et al. | 475/323 |
| 2003/0224900 A1 * | 12/2003 | Sugiura et al. | 475/275 |
| 2004/0048716 A1 * | 3/2004 | Ziemer | 475/286 |
| 2004/0053731 A1 * | 3/2004 | Lee et al. | 475/275 |

FOREIGN PATENT DOCUMENTS

| | | | |
|---|---|---|---|
| DE | 690 10 472 T2 | 3/1995 | F16H/3/66 |
| DE | 199 49 507 A1 | 4/2001 | F16H/3/66 |
| EP | 0 997 663 A2 | 10/1999 | F16H/3/62 |

* cited by examiner

Primary Examiner—Tisha Lewis
(74) Attorney, Agent, or Firm—Davis & Bujold, P.L.L.C.

(57) ABSTRACT

The invention relates to a multi-stage reduction gear by which at least seven speeds can be shifted. Apart from the input shaft (1) and the output shaft (2), the gear consists of a non-engageable upstream gear and an engageable downstream gear in the form of a gear with two fixed links and four shafts. The upstream gear consists of a first planetary gear (3) which, next to the input RPM of the input shaft (1), also provides a second RPM which can be shifted alternatively via a downstream gear. The downstream gear consists of two engageable planetary gears (4, 5) which, with of six shift elements (A to F), can generate a minimum of seven forward speeds, whereby two output paths are formed (P, Q). Thereby, series shifts are always avoided for each shift action.

6 Claims, 5 Drawing Sheets

Fig. 3

| Speed | \multicolumn{6}{c}{Closed Shift Elements} | Transmission | Gradation | Spread of Gear Ratios |
|---|---|---|---|---|---|---|---|---|---|
| | A | B | C | D | E | F | | | |
| 1 | O | | | O | | | 5,80 | | |
| 2 | O | | O | | | | 3,09 | 1,88 | |
| 3 | O | | | | | O | 2,00 | 1,54 | |
| 4 | O | O | | | | | 1,48 | 1,35 | 8,20 |
| 5 | O | | | | O | | 1,21 | 1,22 | |
| 6 | | O | | | O | | 1,00 | 1,21 | |
| 7 | | | | | O | O | 0,83 | 1,20 | |
| 8 | | | O | | O | | 0,71 | 1,17 | |
| R1 | | | | O | | O | -5,00 | | |
| R2 | | O | O | | | | -2,50 | | |

Park transmission:

| Speed | Closed Shift Elements | | | | | | Transmission | Gradation | Spread of Gear Ratios |
|---|---|---|---|---|---|---|---|---|---|
| | A | B | C | D | E | F | | | |
| 1 | O | | | O | | | 5,42 | 1,70 | 7,80 |
| 2 | O | | O | | | | 3,20 | 1,44 | |
| 3 | O | | | | | O | 2,22 | 1,37 | |
| 4 | O | O | | | | | 1,62 | 1,26 | |
| 5 | O | | | | O | | 1,29 | 1,29 | |
| 6 | | O | | | O | | 1,00 | 1,24 | |
| 7 | | | | | O | O | 0,81 | 1,16 | |
| 8 | | | O | | O | | 0,70 | | |
| R1 | | | | O | | O | -5,07 | | |
| R2 | | O | | O | | | -2,28 | | |

Park transmission:

$i\_0\_3 = +2,22$
$i\_0\_4 = -2,28$
$i\_0\_5 = -2,28$

MULTI-STAGE TRANSMISSION

FIELD OF THE INVENTION

The present invention relates to a multi-stage reduction gear, which is able to shift into eight forward speeds.

BACKGROUND OF THE INVENTION

Such a gear is known from DE 690 10 472 T2. This gear essentially consists of an input shaft and an output shaft, which are arranged coaxially to each other, a double planetary gear which is arranged concentrically with the output shaft, and five shift elements in the form of three clutches and two brakes, whose alternative actuation, which occurs always in pairs, determines the various speed transmissions between the input shaft and the output shaft.

The known gear consists of two output paths whereby a first element of the double planetary gear is connected to the first output paths by means of a first clutch, a second element of the double planetary gear has a fixed connection with the output shaft, a third element is connected to the second output path by means of a third clutch and is locked by a first brake, and a fourth element of the double planetary gear is connected to the first output path by means of a second clutch and is reduced by a second brake, so that the alternative shifting, which always occurs in pairs between the shifting element is guaranteed in such a way that six forward speeds are created. Thereby, a first speed is shifted by means of the first clutch and the first brake, a second speed by means of the first clutch and the second brake, a third speed by the first and second clutches, a fourth speed by means of the first and third clutches, a fifth speed by means of the second and third clutches, and a sixth speed by means of the third clutch and the second brake. Finally, the reverse gear is shifted by means of the second clutch and the first brake.

The invention is based on the task of creating a multi-stage reduction gear which can shift to eight forward speeds and provides a favorable speed grading as well as, at the same time, a large spread of gear ratios.

SUMMARY OF THE INVENTION

The gear according to the invention essentially consists of an input shaft, an output shaft and three planetary gears, whereby one of the planetary gears can be engaged and two other planetary gears cannot be engaged. The first planetary gear forms an upstream gear and the two engageable planetary gears together form a downstream gear in the form of a gear consisting of two fixed links and four shafts.

The gear has two output paths. In the first output shaft, the input speed is geared with a second speed via the first planetary gear by means of a fixed transmission. In the second output path, the input speed is directly transmitted into the two planetary gears of the downstream gear.

The downstream gear consist of two planetary gears which, in turn, consist of 4 shafts, whereby the first shaft is connected to the first output path by means of the first clutch, the second shaft with the first output path by means of a second clutch, and by means of a third clutch with the second output path, and which is also stopped by a first brake; whereby the third shaft is connected with the second output path by means of a fourth clutch and is stopped by means of a second brake, and whereby the fourth shaft has a fixed link with the output shaft. Hereby a first speed is shifted by means of the first clutch and the second brake, a second speed by means of the first clutch and the first brake, a third speed by means of the first and second clutches, a fourth speed by means of the first and the third clutches, a fifth speed by means of the first and fourth clutches, a sixth speed by means of the third and the fourth clutches, a seventh speed by means of the second the fourth clutches, and an eighth speed by means of the fourth clutch and first brake, the first reverse gear by means of the second clutch and the second brake, as well as a second reverse gear by means of the third clutch and the second brake.

An essential advantage consists of the fact, that the multi-stage reduction gear, according to the invention, has eight forward speeds with a smaller number of gears and shift elements. Thereby in each shifted gear, only two shift elements are shifted each. When shifting from one speed to the next, only one shift element is disengaged and another shift element is engaged. Thus, shifting series, in which several shift elements simultaneously have to be put into gear, and which can be critical for the shift quality, can be avoided.

The following applies to the RPMs at the shafts and the shift elements:
1. The RPM at the input shaft and at the shift elements E and B is n="one" (as a normed size);
2. The RPM at the shift elements A and F is equal and is in the range of >"zero" and <"one".
3. The RPM at the shift elements C and D equals "zero";

The following description relates to preferred implementations of the invention, which relate to multi-stage reduction gears, which can be produced cost-efficiently. In these, as many speeds as possible are shifted into gear with the smallest possible number of shift elements.

BRIEF DESCRIPTION OF THE DRAWINGS

The invention will now be described, by way of example, with reference to the accompanying drawings in which:

FIG. 3 is a table with the shift logic regarding FIG. 1 and FIG. 2, with the exemplary transmission of the individual speeds, of the spread of the gear ratios, and the park transmission of the individual planetary gears;

FIG. 5 is a table with the shift logic regarding FIG. 4 with the exemplary transmission of the individual speeds, the spread of the gear ratios and the park transmission of the individual planetary gears.

DETAILED DESCRIPTION OF THE INVENTION

Figure 1:
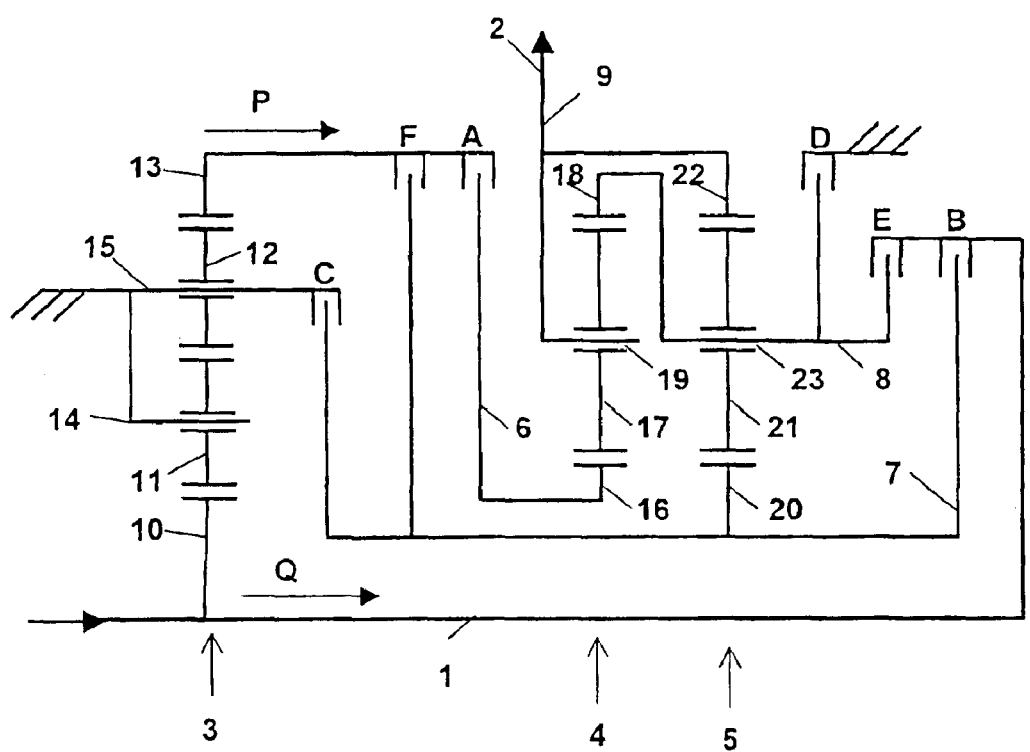
FIG. 1 is a gear diagram of a first implementation of a multi-stage reduction gear with eight forward speeds and two reverse gears.

FIG. 1 provides a schematic illustration of a first example of an implementation of the solution according to the invention. A first planetary gear 3 has a fixed connection with an input shaft 1 by means of a sun wheel 10. The planetary gear consists of inner and outer planet wheels 11, 12. The inner planet wheels 11 are supported by a fixed link 14 and engage with the sun wheel 10 and with the outer planet wheels 12. The outer planet wheels 12 are supported by a fixed link 15 and engage with the inner planet wheels 11, as well as with a ring gear 13, which is connected to a first and a second clutch A, F. Furthermore, the two fixed links 14, 15 as well as a first brake C are tightly coupled to each other and have a fixed connection with the housing. The first planetary gear 3 has a fixed gear ratio which is >zero.

The downstream gear consists of two simple planetary gears 4, 5. Planetary wheels 17 are supported by a fixed link 19, and these gears as well as a sun wheel 16 and a ring gear 18 are part of the planetary gear 4. Planetary wheels 21 are supported by a fixed link 23, and these gears along with a sun wheel 20 and a ring gear 22, are part of the planetary gear 5. The ring gear 18 of the second planetary gear 4 hereby has a fixed connection with the fixed link 23 and the third planetary gear 5.

The first shaft 6 of the downstream gear encompasses the sun wheel 16 of the second planetary gear 4 and is connected with the first clutch A. A second shaft 7 consists of a sun wheel 20 of the third planetary gear 5, which is connected with the second clutch F, a third clutch B and the first brake C. A third shaft 8 is a coupler shaft and consists of a ring gear 18 of the second planetary gear 4 and a fixed link 23 of the third planetary gear 5 and is connected to a fourth clutch E, as well as the second brake D. A fourth shaft 9 is also a coupler shaft and consists of a ring gear 22 of the third planetary gear 5 and a fixed link 19 of the second planetary gear 4 and has a fixed connection with the output shaft 2.

Figure 2:
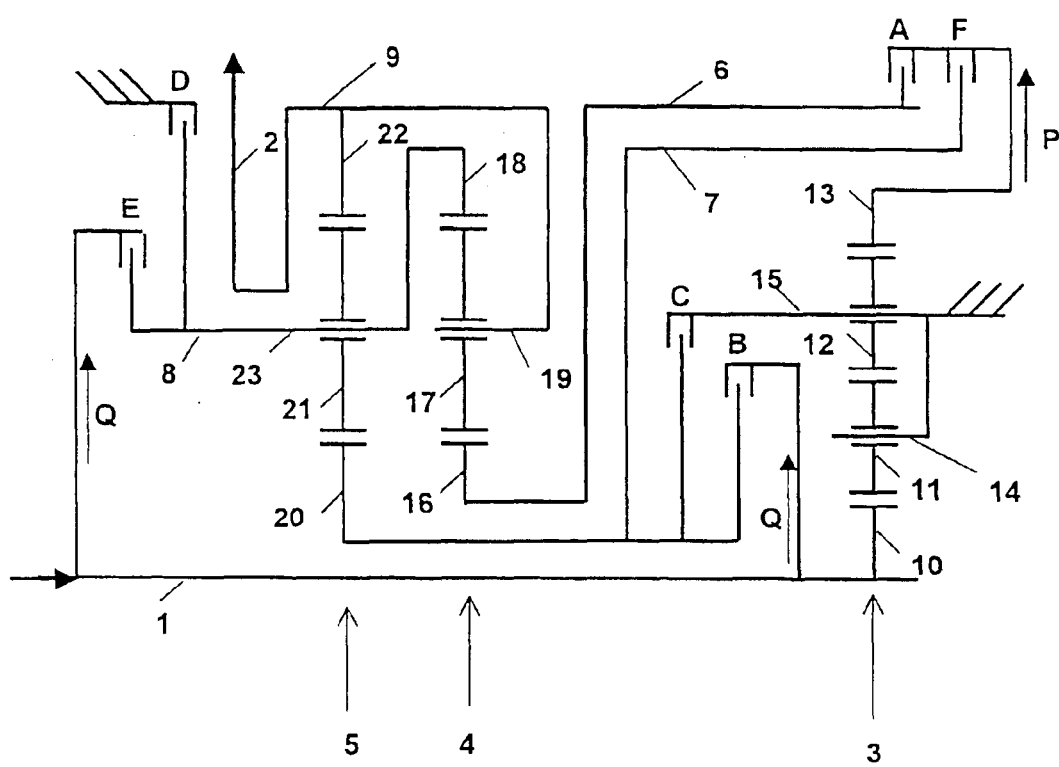
FIG. 2 is a gear diagram of another implementation of a multi-stage reduction gear with eight forward speeds and two reverse gears.

FIG. 2 shows an alternative version of the first example of an implementation whereby, as opposed to FIG. 1, clutch B is arranged between brake C and the upstream gear. All elements common to FIG. 1 and FIG. 2, or performing the same functions, are designated with the same reference numerals. This arrangement may result in advantages with respect to the oil supply to clutch B and the total space requirement of the transmission, in comparison to the first example of the implementation. Of course, clutch E can, for example, be arranged underneath brake D or also between brake D and the third planetary gear 5, just as well as the clutch assembly A and F may be arranged via the clutch B and the brake C or between the clutch B and the brake C and the second planetary gear 4.

FIG. 3 shows the shift logic pertaining to the first two examples of implementation, as well as exemplary transmission of the individual speeds, speed gradation, spread of gear ratios and park transmission of the individual planetary gears.

Figure 4:
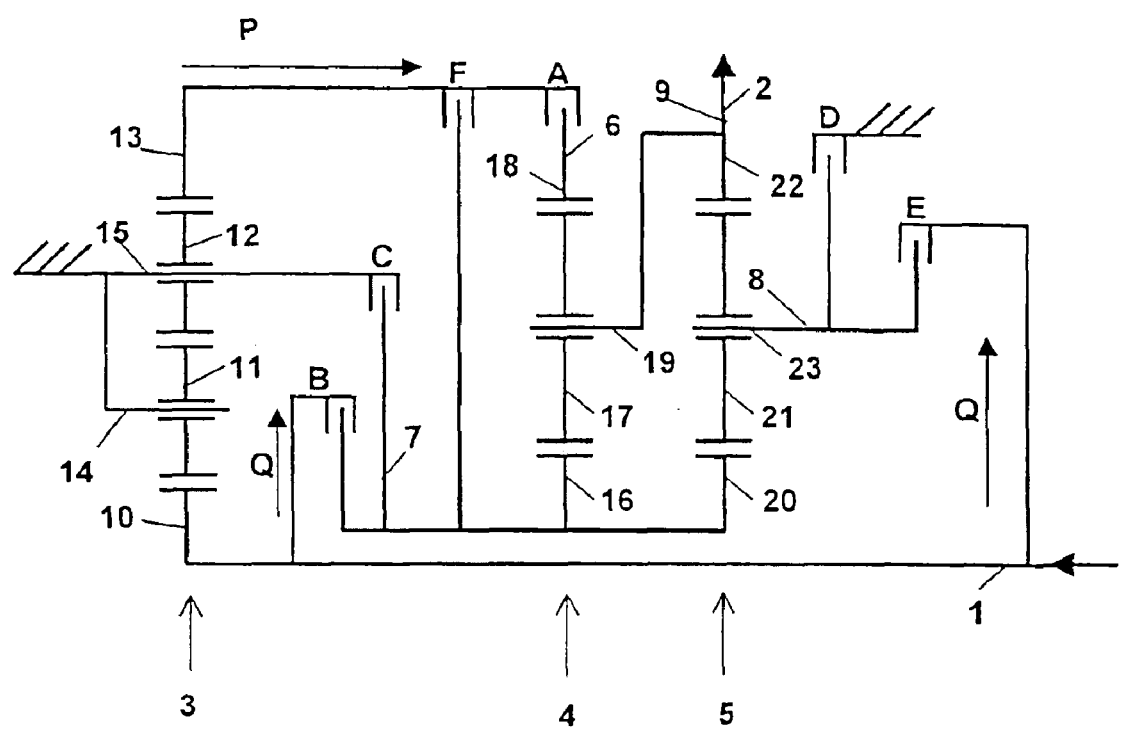
FIG. 4 is a gear diagram of another implementation of a multi-stage reduction gear with eight forward speeds and two reverse speeds.

FIG. 4 illustrates a further example of an implementation of a gear according to the invention. The upstream gear corresponds to the first planetary gear 3 from FIG. 1. The planetary gear 3 has a fixed connection to the input shaft 1 by means of a sun wheel 10. The planetary gear 3 has inner and outer planet wheels 11, 12. The inner planet wheels are supported by a fixed link 14, and engage with the outer planet wheels 12 and with the sun wheel 10. The outer planet wheels 12 are supported by a fixed link 15 and engage with the inner planet wheels 11, as well as a ring gear 13, which is connected with the first and the second clutch A, F. Furthermore the two fixed links 14, 15, as well as a first brake C, are firmly coupled to each other and have a fixed connection with the housing. A first output path P can be connected with the downstream gear by means of planetary gear 3 and the first two clutches A, F.

The downstream gear consists of two simple planetary gears 4, 5. Hereby the planetary gear 4 encompasses planet wheels 17, which are supported by a fixed link 19 and engage with a sun wheel 16 and a ring gear 18. The planetary gear 5 encompasses the planet wheels 21, which are supported by a fixed link 23 and which engage with a sun wheel 20 and a ring gear 22. The sun wheels 16 and 20 have a fixed connection with each other, just as the fixed link 19 has a fixed connection with the ring gear 22.

A first shaft 6 of the downstream gear consists of a ring gear 18 of the second planetary gear 4 and is connected with a first clutch A. A second shaft 7 consists of a coupler shaft between the sun wheels 16 and 20 is connected with the second and third clutch F, B, as well as a first brake C. A third shaft 8 consists of the fixed link 23 of the third planetary gear 5 and is connected to the fourth clutch E. A fourth shaft 9 consists of a coupler clutch between the fixed link 19 of the second planetary gear 4 and the ring gear 22 of the third planetary gear 5 and has a fixed connection with the output shaft 2.

The advantage of the third example of implementation according to the invention, in comparison to the first two, consists in that the sun wheels 16 and 20 are arranged next to each other on the shaft 2. Herewith, the two sun wheels 16, 20 can be produced in just one production cycle which may reduce the production costs. Furthermore, the sun wheels 16, 20 can be arranged closer to each other, than with the separate way of construction, which saves construction space. Furthermore, the two planetary gears 4, 5 can be produced with the same gear ratios, which again can save production costs.

FIG. 5 shows the shift logic pertaining to the third example of implementation, as well as exemplary transmissions of the individual speeds, speed gradation, spread of gear ratio and park transmissions of the individual planetary gears.

In all three examples of implementation, FIGS. 1, 2 and 4, the first speed is shifted by means of the first clutch A and the second brake D, the second speed by means of the first clutch A and the first brake C, the third speed by means of the first clutch A and the second clutch F, the fourth speed by means of the first clutch A and the third clutch B, the fifth speed by means of the first clutch A and the fourth clutch E, the sixth speed by means of the third clutch B and the fourth clutch E, the seventh speed by means of the fourth clutch E and the second clutch F, the eighth speed by means of the first brake C and the fourth clutch E, the first reverse gear by means of the second brake D and the second clutch F, and the second reverse gear by means of the third clutch B and the second brake D.

Furthermore, the possibility is given in all three examples of an implementation according to the invention, to shift eight forward speeds and two reverse gears by means of only six shift elements. In comparison hereto, a maximum of six forward speeds are shifted with five shift elements according to the mentioned state of the art. Thus, with just one additional shift element, two more forward speeds are obtained. This means, that with very few constructional requirements, a large increase in engageable speeds is made possible.

In the three examples of implementation according to the invention, the RPM feed may also occur from the opposite side.

Reference Numbers
A first clutch
B third clutch
C first brake
D second brake
E fourth clutch
F second clutch
P first output path Q second output path
1 input shaft
2 output shaft
3 first planetary gear
4 second planetary gear
5 third planetary gear
6 first shaft
7 second shaft
8 third shaft
9 fourth shaft
10 sun wheel
11 inner planet wheels
12 out planet wheels
13 ring gear
14 fixed link
15 fixed link
16 sun wheel
17 planet wheel
18 ring gear
19 fixed link
20 sun wheel
21 planet gear
22 ring gear
23 fixed link

What is claimed is:

1. A multi-stage reduction gear comprising:

an input shaft (1);

an output shaft (2);

an upstream gear comprising a double, non-engageable planetary gear (3);

a downstream gear comprising two simple, engageable planetary, gears (4, 5); and six shift elements (A to F) comprising first, second, third and fourth clutches (A, F, B, E) and first and second brakes (C, D) which together with the two planetary gears (4, 5) and shafts (6 to 9) pertaining thereto, form two output paths (P, Q);

wherein the input shaft (1) is connected with the third clutch and the fourth clutch (B, E) as well as a sun wheel (10), a first fixed link (14) supports inner planet wheels (11) which engage with the sun wheel (10) and outer planet wheels (12), a second fixed link (15) supports the outer planet wheels (12) which engage with the inner planet wheels (11) and a first ring gear (13), the first ring gear (13) has a fixed connection with the first and the second clutch (A, F), the first and second fixed links (14, 15) are coupled with each other and have a fixed connection with the first brake (C), as well as a housing, a first output path leads via the upstream planetary gear (3) and the first clutch (A) on a first shaft (6) and via the second clutch (F) on a second shaft (7), the second output path (Q) leads via the third clutch (B) on the second shaft (7) and via the fourth clutch (E) on a third shaft (8), the first shaft (6) is connectable with a second ring gear (18) by the first clutch (A), a third fixed link (19) support second planet wheels (17) which engage with a second sun wheel (16) and the ring gear (18), the ring gear (18) is coupled with a fourth fixed link (23) and forms the third shaft (8), the third shaft (8) is connectable with the fourth clutch (E) and can be locked by the second brake (D), the fourth fixed link (23) supports third planet wheels (21) which engage with a third sun wheel (20) and a third ring gear (22), the third sun wheel (20) forms the second shaft (7) which is lockable by the first brake (C), which is connectable with the first output path (P) by the second clutch (F) and with the second output path (Q) by the third clutch (B), the second output path is connectable with the second shaft (7), the fixed link (19) is coupled with the third ring gear (22) and forms the fourth shaft (9), which has a fixed connection with the output shaft (2).

2. The multi-stage reduction gear according to claim 1, wherein viewed from a drive side of the multi-stage reduction gear, the first brake (C), the second clutch (F) and the first clutch (A) are all sequentially arranged between the upstream gear and the downstream gear.

3. The multi-stage reduction gear according to claim 1, wherein viewed from a drive side of the multi-stage reduction gear, the first brake (D), the second clutch (E) and the third clutch (B) are all sequentially arranged between the downstream gear and a housing of the multi-stage reduction gear.

4. The multi-stage reduction gear according to claim 1, wherein viewed from a drive side of the multi-stage reduction gear, the fourth clutch (E) and then the second brake (D) are both arranged between the housing and the downstream gear.

5. The multi-stage reduction gear according to claim 1, wherein viewed from a drive side of the multi-stage reduction gear, the first clutch (C), then the third clutch (B) are arranged between the downstream gear and the upstream gear, and the first clutch (A) and then the second clutch (F) are arranged between the upstream gear and the housing.

6. The multi-stage reduction gear according to claim 1, wherein the input shaft (1) is connected with the third and fourth clutches (B, E) and the sun wheel (10), the first fixed link (14) supports the inner planet wheels (11) which engage with the sun wheel (10) and the outer planet wheels (12), the second fixed link (15) supports the outer planet wheels (12) which engage with the inner planet wheels (11) and the first ring gear (13), the first ring gear (13) has a fixed connection with the first and second clutches (A, F), the first and second fixed links (14, 15) are coupled with each other and are connected with a first brake (C) and with the housing, the first output path (P) leads to the first shaft (6) via the upstream planetary gear (3) and the first clutch (A) and to the second shaft (7) via the second clutch (F), the second output path (Q) leads to the second shaft (7) from the input shaft (1) via the third clutch (B), and to the third shaft (8) via the fourth clutch (E), the first shaft (6) can be connected with the second ring gear (18) via the first clutch (A), the third fixed link (19) supports the second planet wheels (17), which engage with the second ring gear (18) and the second sun wheel (16), the second sun wheel (16) is coupled with the third sun wheel (20) and forms the second shaft (7), the third fixed link (19) is coupled with the third ring gear (22) and forms the fourth shaft (9), which has a fixed connection with the output shaft (2), the fourth fixed link (23) supports the third planet wheels (21) which engage with the third ring gear (22) and the third sun wheel (20), and the fourth fixed link (23) is lockable via the second brake (D) and forms the third shaft (8).

* * * * *